Nov. 4, 1941.  M. H. GROVE  2,261,364
FLUID FLOW CONTROLLING APPARATUS
Filed Aug. 29, 1938  2 Sheets-Sheet 1
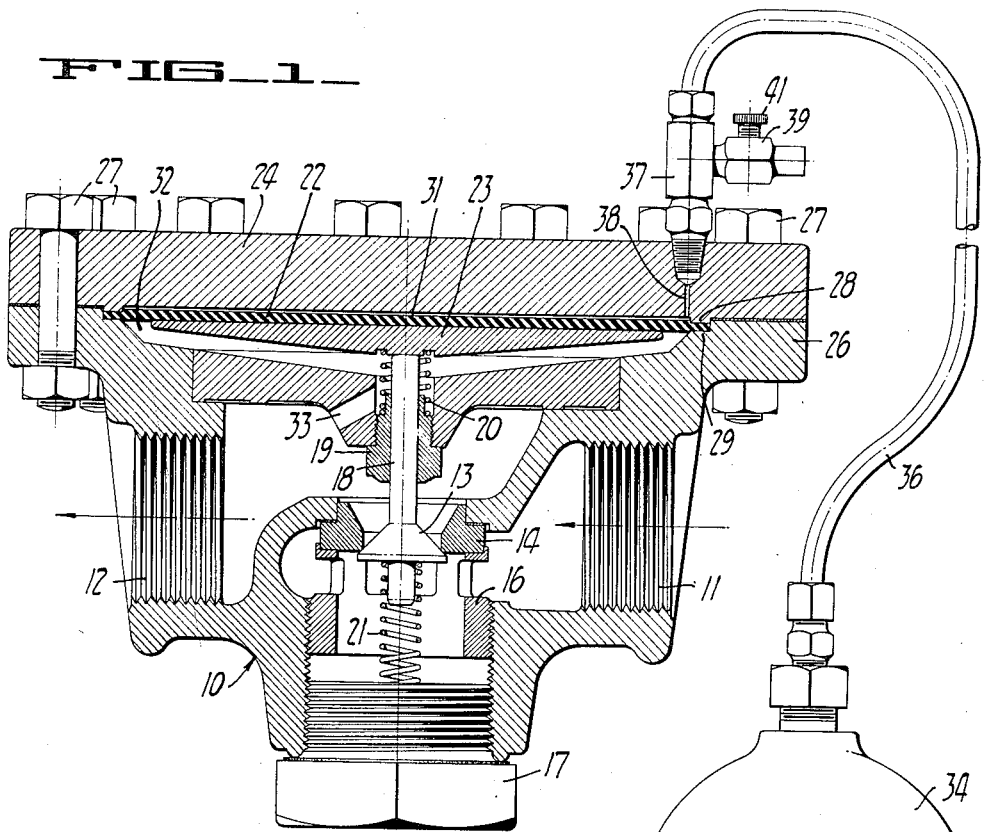
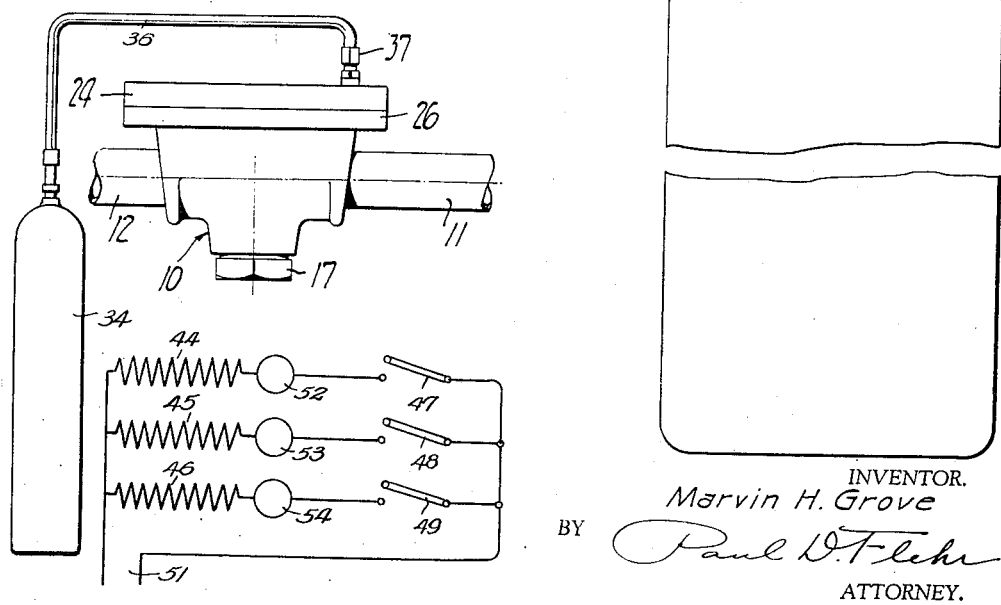
INVENTOR.
Marvin H. Grove
BY Paul D. Flehr
ATTORNEY.

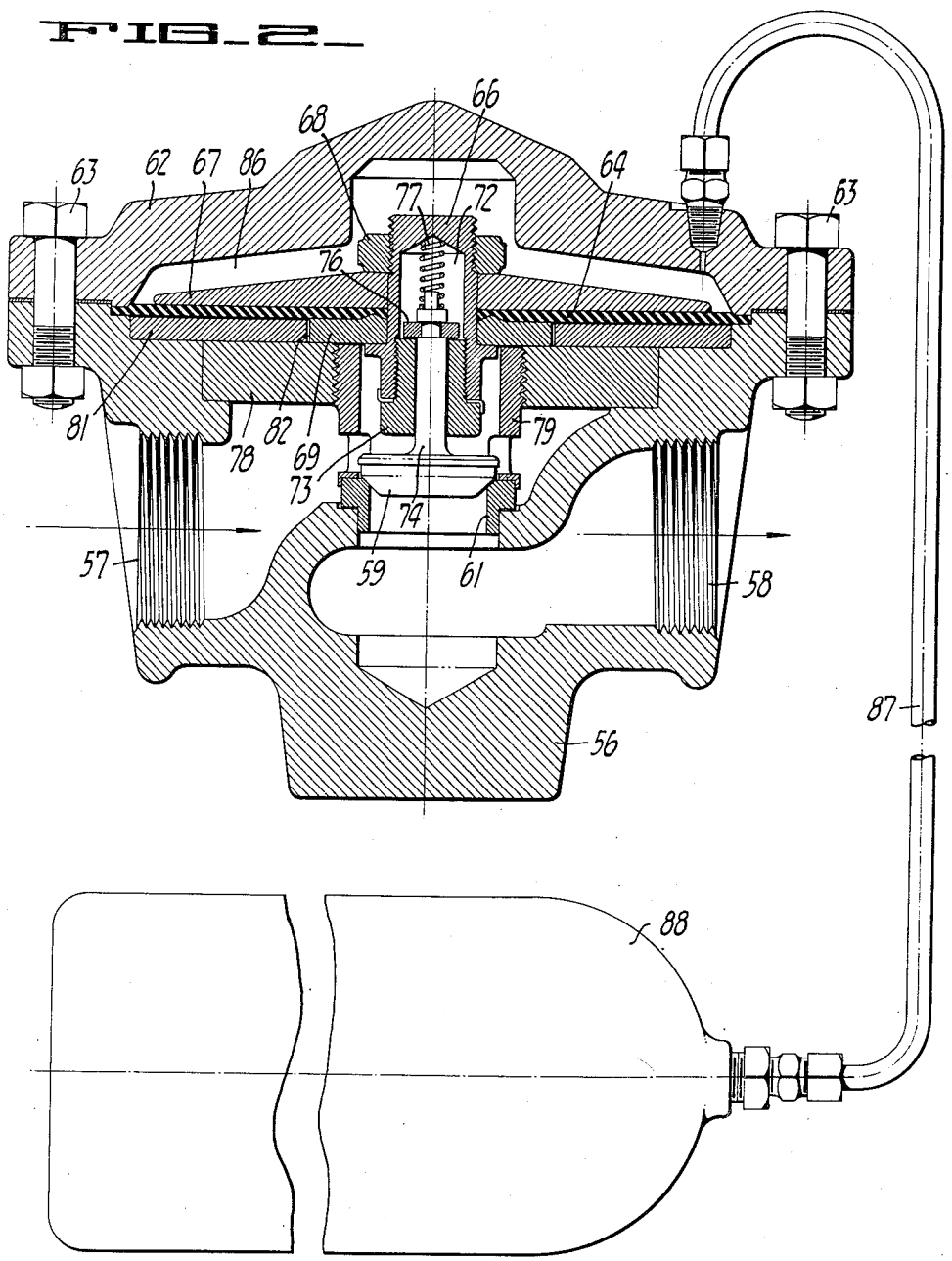

Patented Nov. 4, 1941

2,261,364

UNITED STATES PATENT OFFICE 2,261,364

FLUID FLOW CONTROLLING APPARATUS

Marvin H. Grove, Berkeley, Calif.

Application August 29, 1938, Serial No. 227,243

3 Claims. (Cl. 50—21)

This invention relates generally to apparatus for automatically regulating flow of various fluids. In a typical example the invention is incorporated in a pressure regulator serving to supply fluid at a substantially constant pressure to a point of demand, and from a relatively higher pressure source of fluid supply. In another example disclosed herein, the invention automatically vents fluid from a source of supply under pressure, when the pressure from the source increases beyond a predetermined value.

Automatic pressure controllers or regulators generally make use of a valve member movable in opposite directions between open and closed positions, and which is actuated by a flexible diaphragm. A loading force, such as a spring, weight, or gas under pressure, is supplied to one side of the diaphragm, while the other side is subjected to a source of varying pressure, as for example pressure upon the outflow side of the device where it serves the purpose of maintaining a constant pressure upon the outflow side. In many instances loading by gas under pressure has been found preferable to the use of springs or weights. Such loading is more sensitive because of the absence of inertia effects, and because the loading can be readily adjusted over a wide range. As an example of a simple type of pressure regulator making use of gas under pressure for loading the diaphragm, reference can be made to Foster and Thomas British Patent No. 12,999 of 1886. A highly practical and accurate regulator of this type is disclosed and claimed in my Patent No. 2,047,101, granted July 7, 1936.

Where the trapped gas under pressure for loading the diaphragm is carried within a dome mounted directly upon the regulator body, as is the case with the regulator disclosed in said Patent No. 2,047,101, uncontrolled temperature variations transmitted to the trapped gas within the dome, cause variations in loading which at times are undesirable.

It is an object of the present invention to provide an automatic flow controller or regulator of the type making use of gas under pressure for loading the diaphragm, and which will effect a temperature pressure control to produce certain desired results.

Further objects of the invention will appear from the following description in which the preferred embodiments of the invention have been set forth in detail in conjunction with the accompanying drawings:

Referring to the drawings:

Fig. 1 is a side elevational view, partly in cross section, illustrating apparatus for use in connection with the present invention, and intended primarily for maintaining a constant pressure upon the outflow side of the device.

Fig. 2 is a side elevational view, partly in cross section, illustrating another apparatus for use in connection with the invention, intended as a back pressure or pressure relief regulator.

Fig. 3 is a side elevational view, showing an embodiment of the invention in which predetermined temperature changes are produced electrically.

Referring first to that form of the apparatus illustrated in Fig. 1, it consists of a body 10 provided with inflow and outflow passages 11 and 12. Within the body there is a movable valve member 13, cooperating with the removable seat ring 14. The seat ring 14 is held in place by the ported sleeve 16, which in turn is threaded into the lower end of the body. The lower end of the body is shown closed by plug 17.

Valve member 13 is carried upon the lower end of a stem 18, and this stem is slidably accommodated within the guide bushing 19. A light compression spring 21 serves to urge the valve member closed with respect to the seat 14.

For controlling the movement of valve member 13 there is a flexible diaphragm 22 formed of suitable flexible material, such as resilient rubber or resilient synthetic rubber like "Duprene" or "Corprene." The lower side of the diaphragm 22 is engaged by the rigid plate 23, the center of which has abutting engagement with the upper end of stem 18. A light compression spring 20 retains plate 23 in engagement with the lower side of the diaphragm, and also serves to retain the plate 23 generally centered.

In place of a dome secured to the main body part and extending over the diaphragm 22, I provide a heavy rigid flat plate 24, which can be formed of suitable material such as cold rolled steel. The peripheral edge portion of this plate is clamped to an annular flange 26 provided on the body, as by means of bolts 27. Annular areas 28 and 29 formed respectively on the plate 24 and the upper face of body 10, form opposed clamping shoulders for squeezing and gripping the peripheral edge portion of the diaphragm 22, thus affording a sealed joint. A comparatively small place or clearance 31 is provided between the lower face of the plate 24, and the upper face of the diaphragm 22. Thus with a diaphragm in the neighborhood of 7 inches in diameter and in position corresponding to closed position of the valve, this clearance may be of the order of 1/32 of an inch. As the diaphragm 22 moves downwardly to force the valve member 13 to open position, the clearance increases in accordance with the permissible travel of the valve member. With a reasonable permissible travel of the valve member, as for example a travel of the order of 3/8 of an inch, it will be evident that the clearance is a minor fraction of the travel of the diaphragm in moving the valve member between open and closed positions. Below the diaphragm 22 and plate 23, there is a clearance or space 32 of ample dimension to permit the necessary downward flexing movement of the diaphragm. This space is shown connected to the outflow side 12 by the unrestricted duct 33.

As representative of an external source of loading pressure I have shown a pressure flask 34, which is suitably constructed in accordance with the pressure requirements. A small tube or pipe 36 is shown having its one end connected to flask 34, and its other end connected to the plate 24 by fitting 37. In order to secure operation free from fluttering or chattering, a flow restricting orifice 38 establishes communication between the space 31 and pipe 36. As an example of dimensioning which can be used in practice, the opening 38 can be of the order of 1/32 of an inch, where the diaphragm is of the order of 7 inches diameter and the clearance 31 of the order of 1/32 of an inch, as previously specified. For the purpose of adjusting or varying the pressure in flask 34, a small fitting 39 is shown, having a needle valve 41 or other form of shut-off. By opening valve 41 one may introduce additional gas into flask 34, or may bleed gas from the flask, thus altering the pressure to the value desired.

Operation of the apparatus described above can be outlined as follows: The inlet 11 is connected to a source of gas or other fluid under pressure, while the outlet 12 is connected to piping in which it is desired to maintain a predetermined lower pressure. The pressure in the flask 34 is set to be substantially the pressure desired upon the outlet side. Outlet pressure is maintained in the chamber 32 below the diaphragm, and therefore when the outlet pressure falls slightly below the pressure in space 31, the diaphragm is flexed downwardly to move the valve 13 to open position. Sudden flexing movements of the diaphragm occurring when the diaphragm is in the proximity of the lower side of the plate 24, are accompanied by wide variations in pressure in space 31, due to the flow restriction afforded by orifice 38, and such variations in the pressure acting downwardly upon the diaphragm prevent fluttering or chattering of the valve member when in the proximity of its closed position.

The volume of gas in space 31 is relatively small compared to the volume of gas under pressure afforded by the flask 34. Therefore should temperature changes occur to change the temperature of gas in space 31, such changes can not alter the mean effective pressure in this space. The flask 34 may be located at various distances from the remainder of the apparatus, and it may be insulated or housed so that temperature variations to which the regulator may be subjected, will have no effect whatsoever upon the flask. Means will be presently explained for controlling the temperature of the flask, thereby controlling its pressure and operation of the regulator.

Fig. 3 shows an arrangement for controlling the temperature of the flask. Thus the flask 34 is placed in heat transfer relationship with respect to one or more electrical heating elements 44, 45 and 46. At a remote point one may have switches 47, 48, and 49, by the closing of which current may be supplied to the heating elements, from the current supply source 51. Thermostatic controls 52, 53 and 54 set for different temperatures, may be associated with each of the heating elements and thermally associated with the flask, whereby the flask is maintained at any one of several predetermined temperature levels depending upon which one of the switches 47, 48 or 49 is closed. The temperature level maintained in this manner must be above atmospheric and below a level which might cause mechanical injury to the flask. By means of such an arrangement the pressure upon the outflow side of the apparatus can be regulated from a remote point.

Fig. 2 illustrates an embodiment of the invention applied to a back pressure or pressure relief valve. In this case the body 56 is provided with inlet and outlet openings 57 and 58, and within the body there is a valve member 59 cooperating with the seat 61. Extending over the upper side of the body there is a crowned plate 62, the flanged periphery of which is clamped to an annular flange provided on the body, as by means of bolts 63. The flexible diaphragm 64 has its peripheral edge portion clamped between annular portions of the plate 62 and the body, and the central portion of the diaphragm is apertured to receive the fitting 66. The upper side of the diaphragm is engaged by the circular diaphragm plate 67, and the center of this plate is apertured to accommodate the fittings 66. The upper end portion of the fitting 66 is threaded to receive a clamping nut 68. The lower side of the diaphragm is engaged by the rigid disc 69, which in turn is engaged by the annular collar 71, formed on the fitting 66. The fitting 66 is provided with a central bore 72, into which is threaded the guide bushing 73. The stem 74, attached to valve member 59, extends loosely through the bushing 73, and has its upper end carrying a collar 76, whereby a certain amount of lost motion is afforded between the valve stem and fitting 66. A small compression spring 77 is seated upon the upper end of stem 74, and normally urges this stem downwardly.

The upper side of the body 56 is counterbored to receive the annular filler plate 78, and this plate is threaded to receive the threaded sleeve 79. The outer diameter of sleeve 79 is substantially less than the diameter of the disc 69, whereby disc 69 may seat firmly upon the plate 78. The lower end of sleeve 79 engages and retains the annular seat ring 61. Overlying the plate 69, there is a second plate 81, which is of an external diameter substantially equal to the effective diameter of the diaphragm. The central portion of the plate 81 is provided with an opening 82, only slightly larger in diameter than the diameter of disc 69. Because of the proximity of the upper face of plate 81 with the lower face of the diaphragm 64, the diaphragm either contacts directly with the upper face of the plate 81 or is in relatively close proximity with this plate, when the valve member 59 is closed. The space 86 above the diaphragm is shown connected by a tube or pipe 87, with the external flask 88, the temperature of which can be controlled as in Fig. 3.

In operating the apparatus of Fig. 2, the source of pressure or pressure tank with which the apparatus is used, is connected to the inlet 57. The outlet 58 may discharge directly into the atmosphere, or to a bleed-off system of piping. The main pressure in chamber 86 will be set in accordance with the pressure of gas in the flask 88. Pressure on the inlet side is transmitted to the lower side of the diaphragm, and when this inlet pressure exceeds a predetermined value, the diaphragm is forced upwardly to move the valve 59 to open or partially open position. When the pressure on the inlet side again falls below the predetermined value for which the apparatus is set, the diaphragm flexes downwardly to close the valve 59, and arrest further discharge of fluid.

I claim:

1. In apparatus for controlling flow of fluid, a body having inflow and outflow openings, a valve member disposed within said body and movable in opposite directions to control flow of fluid through the body, a flexible diaphragm arranged to control movements of the valve member, means forming a closed gas chamber on one side of the diaphragm whereby gas under pressure in said chamber exerts a loading force upon the diaphragm, a closed flask adapted to contain a predetermined amount of gas under pressure, the volumetric capacity of said flask being substantially greater than the volumetric capacity of said chamber, electrical means for heating the flask, and means for controlling said electrical means to maintain the temperature of the flask at a desired temperature level above atmospheric.

2. In apparatus for controlling flow of fluid, a body having inflow and outflow openings, a valve member disposed within said body and movable in opposite directions to control flow of fluid through the body, a flexible diaphragm arranged to control movements of the valve member, means forming a closed gas chamber on one side of the diaphragm whereby gas under pressure in said chamber exerts a loading force upon the diaphragm, a closed flask adapted to contain a predetermined amount of gas under pressure, the volumetric capacity of said flask being substantially greater than the volumetric capacity of said chamber, electrical means for heating the flask, and means for controlling said electrical means to maintain the temperature of the flask at any one of a plurality of temperature levels above atmospheric.

3. In apparatus for controlling flow of fluid, a body having inflow and outflow openings, a valve member disposed within said body and movable in opposite directions to control flow of fluid through the body, a flexible diaphragm arranged to control movements of the valve member, means including a closed chamber in communication with the space on one side of the diaphragm whereby gas under pressure in said chamber exerts a loading force upon the diaphragm, electrical means for heating the gas in said chamber, and means for controlling said electrical means to maintain the temperature of the flask at any one of a plurality of temperature levels above atmospheric.

MARVIN H. GROVE.